United States Patent [19]

Lay

[11] 4,272,963
[45] Jun. 16, 1981

[54] CYCLIC ENERGY TRANSFORMATION APPARATUS

[75] Inventor: Giles P. Lay, Sulphur, Okla.

[73] Assignee: Layco, Inc., Sulphur, Okla.

[21] Appl. No.: 81,344

[22] Filed: Oct. 3, 1979

[51] Int. Cl.³ .......................... F01K 23/02; F02C 1/02
[52] U.S. Cl. ........................................ 60/655; 60/698;
60/721; 60/649; 62/5
[58] Field of Search ................. 60/649, 655, 671, 651, 60/698, 721; 62/5

[56] References Cited
U.S. PATENT DOCUMENTS

| 3,788,064 | 1/1974 | Hawkins | 60/671 |
| 3,982,378 | 9/1976 | Sohre | 62/5 X |
| 4,051,689 | 10/1977 | MacDonald | 62/5 |

Primary Examiner—Allen M. Ostrager

[57] ABSTRACT

A cyclic energy transformation apparatus and method for developing streams of working fluid flow with different energy characteristics. The working fluid being passed through a container which effectuates a vortical ring flow pattern. The fluid in one stream is discharged from the container as high pressure flow. The fluid in another stream is discharged from the container as a high temperature flow. The separate streams can be used independently or in conjunction with each other for performing useful work.

12 Claims, 4 Drawing Figures

CYCLIC ENERGY TRANSFORMATION APPARATUS

BACKGROUND OF THE INVENTION

The present invention relates generally to the field of energy transformation and more particularly, to the use of a container to establish a vortical ring flow pattern to separate a flowing stream of fluid into branches of flow sharing different energy content.

The general field of this invention apparently descends from the findings of James Clark Maxwell (1831-1879), who is historically credited with determining that bodies of fluid which appear to have equal temperature throughout are actually composed of fluid particles having below average temperatures and fluid particles having above average temperatures, a theory that has not been generally accepted and acted upon. It is known that apparatus for centrifuge action dependant upon vortical ring flow patterns have been used in the study of such weather phenomena as typhoons, hurricanes, tornadoes, desert dust devils and the like, but no evidence has been found to suggest that such devices have ever been configured to branch streams of flow of unequal energy content. Various devices under the generic name of Hilsch Tubes are known to develop streams of unequal energy content but they lack to vortical ring flow pattern capabilities that establishes the near adiabatic economy of operation deemed essential to this type of thermal energy separation.

Economy of operation has not, in times past, been worthy of special consideration because of the abundance and cheapness of fossil fuels. In the recent past it was practical to deal only with high density energy forms so little prior art exists in the use of low density energy forms which, for practical reasons, requires that processing acts be performed with near adiabatic efficiency.

SUMMARY OF THE INVENTION

The present invention is an apparatus and a method for centrifuging with a vortical ring flow pattern so as to branch a flow of working fluid into streams having different energy characteristics without a substantial increase of the total thermal energy within the overall flow pattern.

Other objects, features and advantages of the present invention will become evident from the following detailed description when read in conjunction with the accompanying drawings, which illustrates the preferred embodiment of the invention, and with the appended claims.

DESCRIPTION

Figure 1:
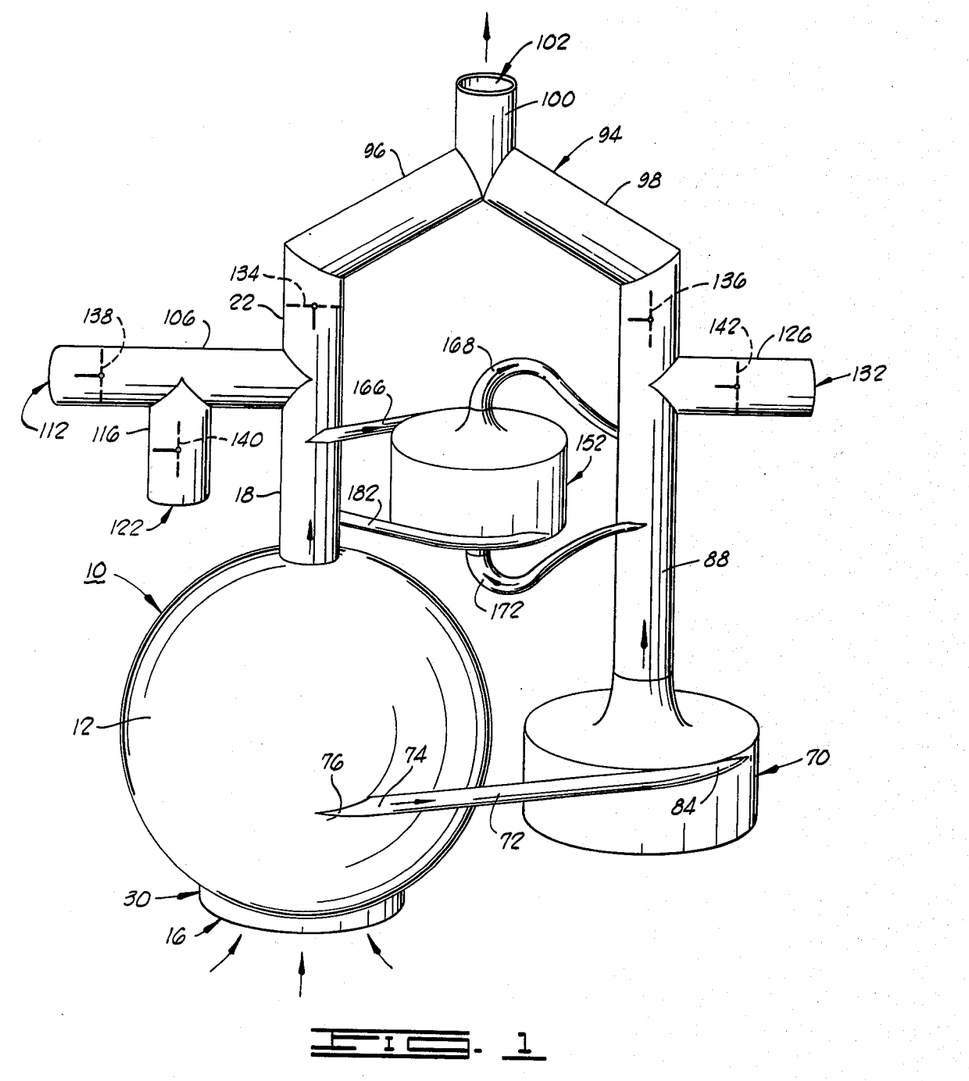
FIG. 1 is a perspective view of a cyclic energy transformation system constructed in accordance with the present invention.

Referring to the drawings in general, and particularly to FIG. 1, shown therein is a cyclic energy transformation system 10 constructed in accordance with the present invention. The cyclic energy transformation system of FIG. 1 is of the type which derives beneficial results from the energy content of a working fluid, such as from a source of a gas at a particular energy level, examples of which will follow hereinbelow.

Figure 2:
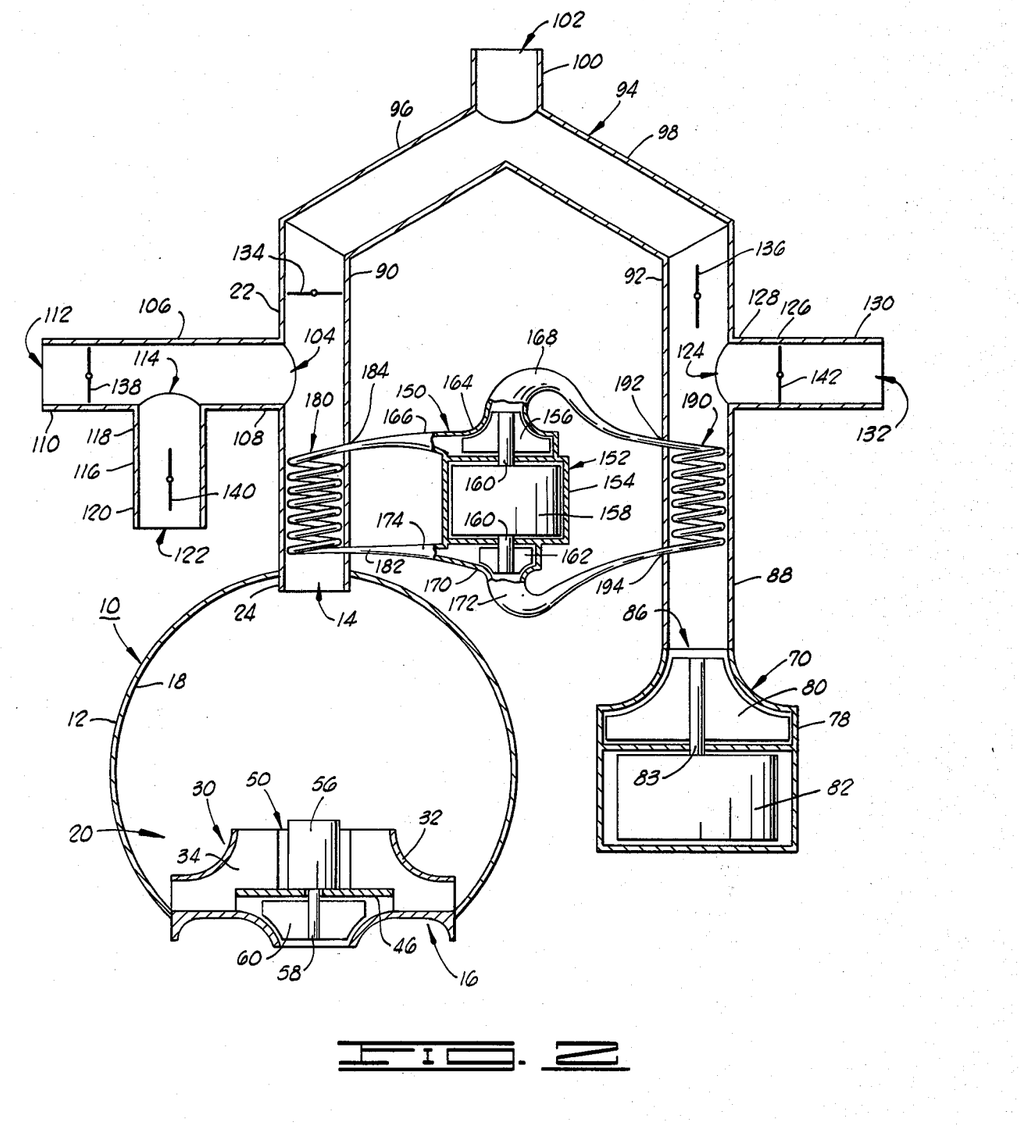
FIG. 2 is a cutaway, elevational view of the cyclic energy transformation system shown in FIG. 1.

The cyclic energy transformation system 10 comprises a spheriod container 12 which has an outlet bore or axial outlet port 14 and a diametrically disposed inlet bore 16, as more readily shown in FIG. 2, which is a partial cutaway view of the cyclic energy transformation system 10 of FIG. 1. The spheroid container 12 has an internal surface 18 which defines an internal cavity 20. A first conduit 22 is disposed with its lower end 24 inserted in the outlet bore 14 of the spheroid container 12, the lower end 24 of the conduit 22 being sized such as to be slidably admitted into the outlet bore 14; sealing or attachment of the lower end 24 may not be required, but it is recommended that the lower end 24 be disposed to penetrate the internal cavity 20 a short distance.

Figure 3:
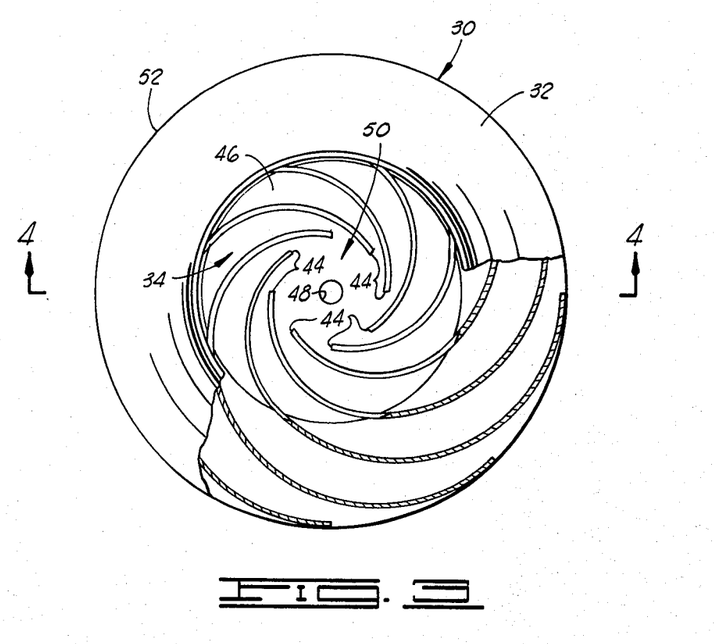
FIG. 3 is a partial cutaway, top view of the vortical ring flow generator assembly which forms a portion of the system shown in FIG. 2.
Figure 4:
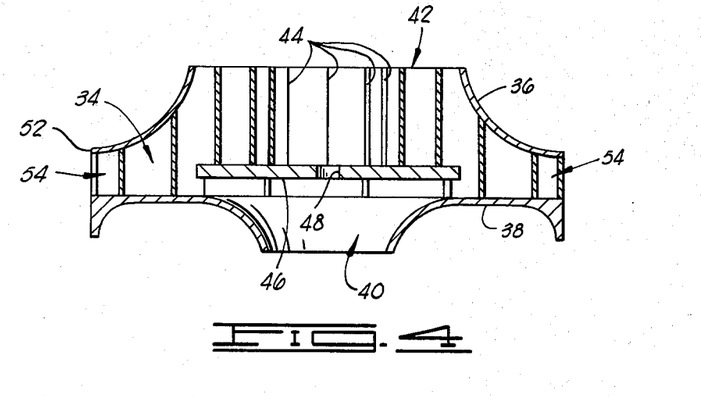
FIG. 4 is a cross-sectional view taken at 4—4 in FIG. 3.

Disposed within the internal cavity 20 of the spheroid container 12 is a vortical ring flow generator 30 which comprises a housing 32 having an internal cavity 34. More particularly, portions of the vortical ring flow generator are also shown in FIGS. 3 and 4; FIG. 3 is a top plan view of the vortical ring flow generator 30 with a motor, described herebelow, missing to more clearly show the vane structure disposed within the internal cavity 34; and FIG. 4 is a cross-sectional view taken along 4—4 in FIG. 3. The housing 32 has an upper wall 36 and a lower wall 38 which are spaced apart and between which is disposed the internal cavity 34. The lower wall 38 forms an initial inlet port 40, and the upper wall 36 forms an internal inlet port 42. Disposed within the internal cavity 34 are a plurality of stationary volute vanes 44 which support a divisional plate 46 which is disposed to be spatially recessed from the initial inlet port 40 in the manner shown in FIG. 4. The divisional plate 46 has a centrally located shaft clearing aperture 48 which is generally axially aligned with the initial inlet port 40. The internal ends of the volute vanes are disposed to form a motor cavity 50; and each of the volute vanes 44 spirals outwardly toward the outer rim 52 of the housing 30. Along the outer rim 52, the ends of the upper wall 36 and the lower wall 38 are spatially separated to form a plurality of channel outlet ports 54. While the overall arrangement of the plural volute vanes 44 will become more clear below, it is noted here that these volute vanes are disposed such that a working fluid such as air entering the initial inlet port 40 and the internal inlet port 42 is directed to be discharged from the plural channel outlet ports 54 disposed peripherally about the housing 30, with the fluid being discharged substantially tangentially and spiraling outwardly as it is caused to flow from the channels formed by adjacently disposed volute vanes 44.

Returning to FIG. 2, the vortical ring flow generator 30 as shown therein is in the assembled position having a motor 56 supported by the divisional plate 46 within the motor cavity 50 and secured therein by any conventional method. The motor 56 is connected to a drive shaft 58 which is disposed to extend through the shaft clearing aperture 48 of the divisional plate 46 and is connected to an impeller or rotor member 60. While the vortical ring flow generator 30 is shown with the motor 56 and rotor 60, it will be understood that these may not be required in applications in which the cyclic energy transformation system 10 is to be utilized with a source of pressurized working fluid; however, the powered impeller 60 is shown in the present embodiment for completeness of disclosure such as will be required in applications using ambient working fluid of relatively low pressure drive. The impeller 60 is disposed to be rotatingly supported near the initial inlet port 40 of the housing 30 and serves to draw low pressure working fluid through the port 40 to be exhausted peripherally into the channels formed between the volute vanes 44 for discharge from the peripherally disposed channel outlet ports 54. A screen or some form of spider protective network may be desirable for safety precaution measures at the initial inlet port 40, but such is not shown in the figures for the purpose of simplifying the drawings. Also, the electrical wiring to the motor 56 is omitted from the drawings for the same reason.

The vortical ring flow generator 30 is disposed substantially within the internal cavity 20 of the spheroid container 12 and is shaped to substantially fill the inlet bore 16 thereof. Conventional attachment mechanisms may be required to secure the vortical ring flow generator 30 securely in place, but such attachment mechanisms have been omitted from the view shown in FIG. 2 as such are deemed conventional. Also omitted from FIG. 2 is the frame substructure required to support the spheroid container 12, but it will be understood that some form of frame will be required to support and stabilize each of the portions of the cyclic energy transformation system 10 which have been or which are to be described hereinbelow.

Returning to FIG. 1, the cyclic energy transformation system 10 also comprises a turbo generator assembly 70 which is fluid connected to the spheroid container 12 via a turbo generator feeder conduit 72 which has a first end 74 attached to the spheroid container 12 at an opening 76, the opening 76 forming a first outlet port communicating with the internal cavity 20. Although not shown in the drawings, the first end 74 is shaped to be flush with the internal surface 18 of the internal cavity 20 in the spheroid container 12.

The turbo generator assembly 70 is a conventional unit of the type which was found many practical applications, such as, for example, that used to generate an emergency electrical supply in aircraft. Therefore, only basic details of the structure of the turbo generator 70 need be shown for the purpose of the present disclosure. In FIG. 2, the turbo generator 70 is comprised of a housing 78 in which are located a turbine member 80 which is drivingly connected to a generator 82 as shown in FIG. 1. The turbo generator feeder conduit 72 has a second end 84 which is attached to the housing 78 of the turbo generator assembly 70 in the manner similar to that described for the attachment of the first end 74 to the spheroid container 12. That is, the second end 84 is connected to the housing 70 through a peripheral opening (not shown) and extends internally therein in a conventional manner with the end thereof disposed to direct pressurized working fluid in driving engagement with the turbine 80. The housing 78 has an exhaust or outlet port 86 to which is connected a second conduit 88 which is similar in shape to the above mentioned first conduit 22 which is attached to the spheroid container 12 at the outlet bore 14.

The first conduit 22 and the second conduit 88 are conveniently disposed to extend upwardly in a generally parallel manner and are joined at their upper ends 90 and 92, respectively, to a branched manifold section 94. The manifold section 94 has a first leg conduit 96 which connects to the upper end 90 of the first conduit 22, and a second leg conduit 98 which connects to the upper end 92 of the second conduit 88. The first and second leg conduits converge and connect to a nozzle conduit 100 that has an opening 102 which may serve as a thrust nozzle.

The first conduit 22 has an outlet bore 104, and a manifold conduit 106 is attached to the first conduit 22 at the outlet bore 104 by its first end 108. The other or second end 110 of the manifold conduit 106 forms a heating duct 112. The manifold conduit 106 has an outlet bore 114, and a branch conduit 116 is attached to the manifold conduit 106 at the outlet bore 114 by its first end 118, the other or second end 120 forming a recirculating duct 122. Also, the second conduit 88 has an outlet bore 124, and a manifold conduit 126 is attached to the outlet bore 124 via a first end 128 at the outlet bore 124. The other or second end 130 of the manifold conduit 126 forms a cooling duct 132. Conventional butterfly-type damper valves are located in the above described conduits as follows: a damper valve 134 is disposed near the upper end 90 of the first conduit 22; a damper valve 136 at the upper end 92 of the second conduit 88; a damper valve 138 near the second end 110 of the manifold conduit 106; a damper valve 140 near the second end 120 of the branch conduit 116; and a damper valve 142 near the second end 130 of the manifold conduit 126. Each of the damper valves 134, 136, 138, 140 and 142 is disposed to be pivoted by externally extending handles as shown in FIG. 1, and are disposable in a conduit open position, a conduit closed position, and in intermediate positions therebetween. In the conduit open position, the damper valves permit fluid to flow in the conduits substantially unimpeded; in the closed position, the damper valves seal the conduits to prevent fluid passage; and of course, the damper valves in the intermediate settings permit varying fluid flow rates in the conduits.

As shown in FIGS. 1 and 2, the cyclic energy transformation system 10 further comprises a turbo generator pump assembly 150 which is supported by the supporting frame structure (not shown) by conventional brackets (also not shown) generally between the parallel first and second conduits 22 and 88. The turbo generator pump assembly 150 has a turbo generator 152 which is generally similar to the turbo generator assembly 70 with the exception that a pump is also attached to the shaft interconnecting the generator and the turbine. That is, the turbo generator 152 has a housing 154 in which is located a turbine member 156 which is drivingly connected to a generator 158 via a shaft 160. The shaft 160 extends through the generator 158 and a pump impeller 162 attached to the distal end of the shaft 160. The turbine 156 is disposed in a turbine housing 164 which has an inlet port 166 and an outlet port 168. The pump impeller 162 is disposed in a pump housing 170 which has an inlet port 172 and an outlet port 174.

The turbo generator pump assembly 150 also comprises an evaporative coil 180 which is supportive internally to the first conduit 22 via brackets (not shown), with a first end 182 thereof extending through a bore in the first conduit 22, and with a second end 184 thereof extending through another bore in the first conduit 22. The first end 182 of the evaporative coil 180 is attached to the outlet port 174 of the pump housing 170, and the second end 184 is attached to the inlet port 166 of the turbine housing 164.

The turbo generator pump assembly also comprises a condensing coil 190 which is supported internally to the second conduit 88 via brackets (not shown), with a first end 192 thereof extending through a bore in the second conduit 88, and with a second end 194 extending through another bore in the second conduit 88. The first end 192 of the condensing coil 190 is attached to the outlet port 168 of the turbine housing 164, and the second end 194 is attached to the inlet port 172 of the pump housing 170.

The turbo generator pump assembly 150, in combination with the evaporation coil 180, the condensing coil 190 and the associated plumbing for the interconnections form a non-combustion heat engine when charged with a secondary working fluid such as Freon via a conventional charging valve, not shown. While the operation of the turbo generator pump assembly 150 will be described fully below, it will be recognized that there are a number of accessory components which are conventionally utilized in the turbo generator pump assembly 150, such as an expansion orifice, a turbine guide vane assembly and various gauges, which are not shown in the simplified, semi-detailed view depicted by the drawings.

Operation

For an understanding of the operation of the cyclic energy transformation system 10 described hereinabove, it is believed that a brief discussion of the flow of a fluid in what is sometimes referred to as "vortical ring flow" may be helpful. The term "vortical ring flow" refers to the flow of a fluid which is spiraling about an axis of travel in a particular direction; such a flow pattern is found in naturally occurring phenomena such as hurricanes and tornadoes, and may be visualized by considering a cylinderically shaped coiled spring which has been caused to be curved so as to join one end of the coiled spring to the other end of the coiled spring, thus forming the coiled spring into a ring configuration having a central axis extending through the center of the ring. In this exercise of visualization, the channel spaces between adjacent coil layers may be thought to represent channels of flow of a vortical ring pattern with the fluid flowing both along the channels (which will be a spiraling effect) and moving along the curved axis of the coiled spring (that is, moving about the center axis of the ring formed by the coil).

It is assumed that the operational sequence, as well as the structural arrangement, can be more fully understood in the light of the operational theory set forth hereinbelow. It is to be understood that the operational theory descends from results obtained from physical tests and direct observation which proves that the unit does not function as described but does not necessarily prove why it functions as described. Later events may lead to redefinitions of the description of why the unit works as it does. The physical tests have used air as the primary working fluid so that, among other things, weather facts could be used as needed for an aid to understanding.

In weather, for example, it is recignized that the strength of the particle-to-particle cohesive force in an air mass is dependent upon the commonality of the forms of energy present. A cold air mass does not readily mix with a warm air mass and a line of discontinuity called a "front" restricts the development of cohesive bonds between cold air particles and warm air particles, even though the total energy content of the air particles in the cold air mass may be the equal of the total energy content of the air particles in the warm air mass.

The above gives rise to the assumption that the ability of a fluid mass to resist density separations by a centrifuge action is related to the strengths of the particle-to-particle cohesion determined by similarity between various energy forms. When the strength of the particle bond is decreased by energy form manipulations centrifuge actions become more productive.

Another weather factor available in the understanding of the operation theory of this invention relates to what is known in meterology as the "adiabatic lapse rate". Under certain conditions air particles within an air mass become unstable. If displaced from a given position by some external force, they will accelerate away from the original position at a rate greater than that justified by the quantity of external force applied. The particles, in effect, are partially propelled from their original position by the internal energies and this act of energy transformation so reduces the particle-to-particle cohesive bond that the density change in one particle is not necessarily felt by the adjacent particle.

Still another weather factor available as a means of understanding the operational theory of this invention concerns the variance in the rate of thermal energy absorption in accordance with the manner of thermal energy transfer. Air particles in direct contact with an unlike substance will transfer thermal energy at a more rapid rate than air particles will transfer thermal energy to other air particles.

Such factors lend credence to the supposition that air flow characteristics, as well as other fluids, are established at the particle level and these individual particles are amenable to focused manipulation. In this instance, the specific manipulation involves the use of a vortical ring flow pattern to decrease the strength of the cohesive bond between particles of high pressure and particles of high temperature, and to increase the cohesive bond between particles sharing high pressure and particles sharing high temperature. The result of such manipulation enhances a centrifuge action that creates branch streams of air flow in accordance with particle density.

The operational theory of this invention assumes that the quantity of external power required to trigger individual particle energy transformations, and thus manipulate the strength of the involved cohesive bonds, is established by the degree of created non-productive turbulence. Such turbulence tends to equalize and raise the total internal energy level of the individual particles without specific discrimination. Thus, the total amount of external power required for a given unit to alter some given amount of working fluid by some given degree relates to the smoothness of flow, not to the quantity of change accomplished. The smoother the flow, the closer the transformations are to the adiabatic level.

The preferred construction, as detailed, uses electrical energy as a source of external power to establish individual fluid particle energy transformations and transfersals. After the flow has been established and branched into a high pressure stream and a high temperature stream, these different branches of flow are mechanically deenergized and the extracted energy transformed into electrical power in two separate and distinct stages.

The first stage of deenergization involves the direct extraction of energy from the high pressure flow by the conventional method of directing the fluid flow against a reactive surface. The result, in addition to the development of power which can be transferred to some place of intended use, is a decrease in the fluid pressure, velocity and temperature. In effect, the high pressure flow is converted to a low temperature flow as electrical power is produced.

The second stage of deenergization involves an indirect extraction of energy by means of a non-combustion heat engine. The heat engine is driven by the conventional method of directing a thermally energized working fluid against a reactive surface. Unlike conventional combustion-type heat engines, which exhaust the working fluid after the deenergization process, this non-combustion heat engine recycles the working fluid through a looped circuit including a heating coil within one heat exchanger and a cooling coil within another heat exchanges.

In the preferred embodiment, the non-combustion heat engine is driven by a secondary working fluid that can be vaporized below the temperature of the branched stream of primary working fluid having high temperature. Such secondary working fluid is, additionally, liquidized above the temperature of the branched stream of primary working fluid altered from a high pressure condition to a low temperature condition by the use of a direct deenergization mechanism.

As in conventional non-combustion heat engines, a feedback pump is used to perpetuate the cycle by transferring liquid working fluid from the cooling coil to the heating coil, where it is vaporized and caused to generate power that can be transferred to come place of intended use as well as providing power for the operation of the feedback pump.

Obviously the energy characteristics of the branched stream of air flow will be altered by the operation of the non-combustion heat engine in accordance with the power extracted. In all instances, the energy of the high temperature air flow will be lessened, the energy of the low temperature air flow will be increased, and the total energy of two flows downstream of the non-combustion heat engine will be lower than the total energy of the two flows upstream of the non-combustion heat engine by an amount equal to the energy transferred by the non-combustion heat engine to some place of intended use.

It is the intent of the preferred embodiment to limit the transfer of energy by the non-combustion heat engine so that the temperature of the cooled high temperature air remains above, and the temperature of the warm low temperature air remains below, the initial temperature of the air originally inducted into the system. Such limitation allows, when desired, the use of a cooled high temperature air for heating and the use of the warm low temperature air for cooling.

When the need is for cooling without heating, suitable valves are provided to permit the cooled high temperature air to be returned for blending with the initially entering air to enhance the amount of power that can be extracted by the direct and indirect deenergization means.

As depicted, suitable valves are also provided to permit the device to be operated as a modified jet engine. As is common with all jet engines, the propulsive thrust is developed by the reaction to the working fluid which is accelerated away from the engine. Conventional jet engines rely upon high temperatures in the exhausted working fluid to develop the necessary kinetic energies for porpulsion, but the preferred embodiment uses a cold exhaust. In such instance, the modification consists, for a given propulsion effect, of decreasing the velocity of the exhausted mass while increasing the weight of the exhausted mass.

The preferred embodiment is specifically arranged for maximum operational versatility. In circumstances where the needs concern limited functional requirements, some parts of the structure can be eliminated without diminishment of the desired operational results. Such variations will be obvious to those versed in the art.

A cycle of operation of the cyclic energy transformation system 10 is started by the application of an external source of electrical energy to the electric motor 56 so as to establish an inlet air flow through the initial inlet port 40 and the internal inlet port 42, with an outlet air flow through the plurality of channel outlet ports 54 into the internal cavity 20. The internal surface 18 deflectively influences the direction of air flow so as to add those vectors of motion necessary to form the external portion of the vortical ring flow pattern. The internal profile of the vortical ring flow pattern is completed by vectors of motion resulting from the streamlines of air flow within the internal cavity 20 being attracted towards the internal inlet port 42.

Continued operation of the motor 56 will increase the energies of flow within the internal cavity 20 until the total number of air particles flowing from the first outlet port 76 and the outlet bore 14 are equal in number to the air particles entering the initial inlet port 40 of the vortical ring float generator 30. Air particles flowing from the first outlet port 76 will have higher pressure than air particles flowing through the initial inlet port 40 and the outlet bore 14. Air particles flowing from the outlet bore 14 will have higher temperatures than air particles flowing from the first outlet port 76.

High pressure air flows from the first outlet port 76, through the feeder conduit 82, across the turbine member 80, and exhausts from the outlet port 86. The energies of flow within this stream of air will be reduce in accordance with the amount of electrical energy transformed and transferred by the electrical generator 82. To transform the high pressure air to cold air an optimum amount of electrical power must be developed and transferred to a place of use.

Air of reduced temperature flows through the exhaust port 86 into a second conduit 88, passed a condensing coil 190, and to a manifold 106, with the ultimate exhaust direction of flow determined by the settings of the damper valves 136 and 132.

When low temperature air from the second conduit 88 is to be used for cooling, the damper valve 132 is open and the damper 142 is closed. When there is no need for air for cooling, the damper valve 142 is open and the damper valve 132 is closed. This valve configuration permits air from the second conduit 88 to exhaust from the thrust nozzle 102 and results in the development of some degree of propulsive thrust.

Thermal energy will be added to the air flowing through the second conduit 88 by a secondary working fluid flowing within the condensing coil 190, which will be explained following the discussion of the air flow through the other branch, the high temperature branch.

High temperature air flows from the outlet bore 14, through the first conduit 22, past an evaporative coil 180, to a first leg conduit 96 and a manifold conduit 106, with the ultimate exhaust direction of flow determined by the setting of the damper valves 134, 138 and 140.

When high temperature air from the first conduit 22 is to be used for heating, the damper valve 138 is placed in the open position and the damper valve 134 and 140 are placed in the closed position.

When the temperature of the air in the first conduit 22 is less than the desired maximum operating temperature, and there is no need for air for heating, the damper valve 140 is opened and the damper valves 144 and 138 are placed in the closed position. This valve configuration permits air from the first conduit 22 to be returned to the vicinity of the initial port 40 so that the recirculated hot air mixes with the fresh air supply so as to provide a warmer mix of air being pumped into the spheroid container 12.

The temperature of the air flowing through the first conduit 22 is reduced by the amount of thermal energy transferred to the evaporative coil 180 in accordance with a relationship to the condensing coil 190 in the second conduit 88. The evaporative coil 180, the condensing coil 190 and the turbo generator pump assembly 150 provide a non-combustion heat engine function.

Thermal energy from the primary working fluid flowing through the first conduit 22 causes the Freon within the evaporative coil 180 to expand. The condensing coil 190 causes a contraction of the Freon by passing thermal energy to the primary working fluid flowing through the second conduit 88. When vertically arranged, as shown, vaporized Freon will flow from the evaporative coil 180, across the turbine member 156 to the first end 192 of the condensing coil 190 if the thermal energy of the primary working fluid flowing through the first conduit 22 is greater than the thermal energy of a primary working fluid flowing through the second conduit 88. Simultaneously, liquidized Freon will flow from the condensing coil 190 through the second end 194 across the pump impeller 182 to the first end of the evaporative coil 180.

When the contrast of thermal energy between the primary working fluid in the first conduit 22 and the second conduit 88 is sufficiently great, the rate of secondary working fluid circulation will cause rotation of the turbine member 156, with subsequent powering of the generator 158 and the pump impeller 182.

The quantity of thermal energy extracted from the air flowing through the first conduit 22 and the quantity of thermal energy added to the air flowing through the second conduit 88 depends upon the rate of Freon circulation and the amount of energy transformed from the Freon by the turbine member 156 and transferred as electrical power to some place of use.

Operational variations can be achieved by: changing the amount of external electrical power used to circulate the air within the spheroid container 12; changing the amount of electrical power extracted from air flow passing through the turbo generator assembly 70; changing the amount of electrical power extracted from the Freon flow passing through the turbo generator pump assembly 152; changing the settings of the damper valves 134, 136, 138, 140 and 142; or by changing multiples of the controlling factors. Regardless of the control adjustments made, the operational cycle is terminated when the external electrical power to the electric motor 56 is disconnected.

Changes may be made in the construction and arrangement of the parts or elements of the embodiment as disclosed herein without departing from the spirit or scope of the invention as defined in the following claims.

I claim:

1. An apparatus for deriving beneficial results from the separation of a flow of primary working fluid into branches of flow having different energy characteristics, comprising:

a spheroid container having an outlet bore diametrically disposed from an inlet bore, with a first outlet port substantially equidistant between such bores, and having an internal surface shaped to deflect a primary working fluid into non-conflicting streamlines that form a vortical ring flow pattern within the provided internal cavity;

a vortical ring flow generator assembly disposed within, and suitably connected to said inlet bore of said spheroid container, and having an initial inlet port, an internal inlet port, a plurality of channel outlet ports, and a plurality of stationary volute vanes arranged to merge the flow of primary working fluid through said initial inlet port with the flow of primary working fluid through said internal inlet port in a manner permitting the mixed flow of primary working fluid to exhaust from said outlet port with a minimum of turbulence; and a powered pump assembly, suitably connected to said vortical ring flow generator assembly, having a motor and an impeller arranged so that the application of an external source of power causing a pumping action that draws the primary working fluid through said initial inlet port, in a manner that induces additional flow through the internal inlet port, and causes primary working fluid to flow through said vortical ring flow generator outlet port for circulation within said spheroid container internal cavity as such flow is branched for exit through said spheroid container first outlet port or outlet bore.

2. The apparatus as cited in claim 1 with an improvement consisting of a turbo generator assembly, characterized as comprising:

a turbo generator housing, suitably connected by a turbo generator feed conduit to said spheroid container first outlet port in a manner permitting the passage of one of the branched streams of primary working fluid, and having an inlet port and an outlet port;

a turbine member rotatively positioned and supported by a drive shaft between said inlet port and outlet port so that the energies of flow of the branched stream of primary working fluid passing through said turbo generator feed conduit transfers energy to the turbine and drive shaft; and a generator member having, in conventional fashion, one portion suitably connected to said turbine generator pump housing and another portion suitably connected to said rotatable drive shaft so that a portion of the energy transferred by said drive shaft is transformed into power that can be transferred to some place of intended use.

3. The apparatus as cited in claim 2 with an improvement consisting of a non-combustion heat engine, characterized as comprising:

an evaporation coil, containing a second working fluid arranged to accept thermal energy from the primary working fluid branched stream flowing from said spheroid container outlet bore in a manner permitting the primary working fluid to flow through a first conduit and past the evaporation coil without mixing of the primary working fluid with the second working fluid, having an inlet port and an outlet port;

a condensing coil, containing a second working fluid arranged to transfer thermal energy to the primary working fluid branch stream flowing from said turbo generator outlet port in a manner permitting the primary working fluid to flow through a second conduit and past the condensing coil without mixing the primary working fluid with the second working fluid, having an inlet port and an outlet port; and a turbogenerator pump assembly driven by a second working fluid which is heated by one of the branched streams of primary working fluid and cooled by the other branched stream of primary working fluid, and characterized as comprising:

a turbogenerator pump housing having:
- a turbine inlet port connected to said evaporation coil outlet port in a manner permitting passage of the second working fluid;
- a turbine outlet port connected to said condensing coil inlet port in a manner permitting passage of the second working fluid;
- a pump inlet port connected to said condensing coil outlet port in a manner permitting passage of said second working fluid; and
- a pump outlet port connected to said evaporative coil inlet port in a manner permitting passage of said second working fluid;

a turbine member rotatively positioned and supported by a drive shaft between said turbine inlet port and said turbine outlet port so that the energies of flow of the second working fluid moving from the evaporation coil to the condensing coil transfers energy to the turbine and drive shaft;

a generator member having, in conventional fashion, one portion suitably connected to said turbine generator pump housing and another portion suitably connected to said rotatable drive shaft so that a portion of the energy transferred by said drive shaft is transformed into power that can be transferred to some place of intended use; and a pump member rotatively positioned and supported by said drive shaft between said pump inlet port and said pump outlet port so that a portion of the energy transferred by said drive shaft can be transformed into energies of flow by moving second working fluid from the condensing coil to the evaporative coil.

4. The apparatus as cited in claim 1, 2, or 3, with an improvement that provides for coordinative control of the branched streams of primary working fluid caused to flow from said spheroid container outlet bore and said spheroid container first outlet port, further characterized as comprising:

a first conduit, arranged to control the branch of primary working fluid originating as out-flow from the spheroid container outlet bore by means of an adjustment valve in a recirculating duct outlet port, an adjustable valve in a heating duct outlet port, and an adjustable valve in a first leg outlet port;

a second conduit, arranged to control the branch of flow of primary working fluid originating as out-flow from the spheroid container first outlet port by means of an adjustable valve in a cooling duct outlet port, and an adjustable valve in a second leg outlet port; and a branched manifold section arranged to accept any flow of primary working fluid from said first leg outlet port, and to accept any flow of primary working fluid from said second leg outlet port, and to exhaust such accepted primary working fluid through a thrust nozzle outlet.

5. A method of obtaining separation of a flow of air into branched streams of flow wherein a first branched stream has varying energy characteristics from a second branched stream of flow, comprising the steps of:

passing air into a spheroid cavity by a powered pumping action;

circulating the air within the spheroid cavity such that a vortical ring flow pattern is formed by having the moving flow lines of the air deflectively influenced by provided stationary internal surfaces;

removing air particles having above average density through a peripheral outlet port to form the first branched stream; and removing the air particles having less than average density through an axial outlet port to form the second branched stream, the pressure of the air at the peripheral outlet port being greater than the pressure of the air at the axial outlet port, and the temperature of the air at the axial outlet port being greater than the temperature of the air at the peripheral outlet port.

6. The method of claim 5 further comprising the steps of:

directing the first branched stream from said peripheral outlet port to a rotatable turbine member so as to partially deenergize the first branched stream and convert the air particles having above average density and greater than average pressure into air particles having less than average temperature;

transferring energy from the rotated turbine to a generator to develop electrical power.

7. The method of claim 6 further comprising the steps of:

directing the second branched stream from the axial outlet port across the surface of an evaporative coil so as to transfer thermal energy from the air to a refrigerant fluid contained in the evaporative coil;

directing the first branched stream from the turbine member across the surface of a condenser coil so as to transfer thermal energy from a refrigerant fluid contained in the condenser coil to the first branched stream;

directing the flow of refrigerant fluid from the evaporation coil to the condenser coil through a rotatable turbine so as to deenergize the refrigerant fluid to remove a part of the thermal energy obtained by the refrigerant fluid in the evaporative coil before the refrigerant fluid passes to the condensing coil;

transferring a portion of the energy from the refrigerant fluid rotated turbine to a generator to develop electrical power; and transferring a portion of the energy from the refrigerant fluid rotated turbine to a pump so as to move the refrigerant fluid exhausted from the condenser coil to the evaporative coil.

8. The method cited in claim 5, 6, or 7 further comprising the steps of directing the first and second streams to achieve a selected one of the processes of heating, cooling, vehicular propulsion and combinations thereof.

9. A method of separating an initial flow of a primary working fluid into a first branched stream and a second branched stream such that the first branched stream has different energy characteristics than the second branched stream, the method comprising the steps of:
introducing the initial flow of the primary working fluid into a cavity formed such that the initial flow of primary working fluid is separated by a vortical ring flow pattern into the first branched stream and the second branched stream;
removing the first branched stream from the cavity;
removing the second branched stream from the cavity;
deenergizing the first branched stream to extract energy from the first branched stream; and
passing the second branched stream into heat exchanger relationship with a secondary working fluid to heat a portion of the secondary working fluid via transfer of thermal energy from the second branched stream.

10. The method of claim 9 further comprising the steps of:
cooling a portion of the secondary working fluid by transferral of thermal energy to the first branched stream.

11. The method of claim 10 further comprising the steps of:
circulating the secondary working fluid to a generator to produce electrical energy.

12. The method of claim 9, 10, or 11 further comprising the steps of:
directing the first and second branched streams to achieve heating, cooling, vehicular propulsion thrust and combinations thereof.

* * * * *